Oct. 14, 1941.  E. H. STRUBBE ET AL  2,259,398
DOUGH BRAKE MACHINE
Filed Aug. 7, 1940  5 Sheets-Sheet 1

INVENTORS
Edward H. Strubbe
Michael J. Colacurcio
BY
Murray, Sackhoff & Paddack
ATTORNEYS Oct. 14, 1941.   E. H. STRUBBE ET AL   2,259,398
DOUGH BRAKE MACHINE
Filed Aug. 7, 1940   5 Sheets-Sheet 4

INVENTORS
Edward H. Strubbe
Michael J. Colacurcio
BY Murray, Sackhoff & Paddack
ATTORNEYS Oct. 14, 1941.  E. H. STRUBBE ET AL  2,259,398

DOUGH BRAKE MACHINE

Filed Aug. 7, 1940  5 Sheets-Sheet 5

INVENTORS
Edward H. Strubbe
Michael J. Colacurcio
BY
Murray, Sackloff & Paddack
ATTORNEYS Patented Oct. 14, 1941

2,259,398

UNITED STATES PATENT OFFICE 2,259,398

DOUGH BRAKE MACHINE

Edward H. Strubbe and Michael J. Colacurcio, Cincinnati, Ohio, assignors to United Biscuit Company of America, Chicago, Ill., a corporation of Delaware Application August 7, 1940, Serial No. 351,706

15 Claims. (Cl. 107—12)

The present invention relates to dough working machinery and has for an object the provision of a dough brake machine suitable for handling cracker dough, biscuit dough and the like, and which is semi-automatic in operation to the end that full advantage may be taken of the time and manual skill of an operator in speedily folding the dough, while the heavier and less critical operations are performed by cyclically operating mechanism which may be fully automatic and under push button starting control.

A further object of the invention is to provide a machine of this character which is economical of floor space in the plant and is capable of operating on dough batches of various sizes without the necessity of adjustments.

Another object of the invention is to provide a machine of this kind wherein the mechanism can be operated at a somewhat accelerated rate, thereby increasing the output thereof without introducing any appreciable element of fatigue to the operator.

Another object of the invention is to provide a device which permits the customary speed in manually folding the dough as it is sheeted, even though the weight of the form or dough batch be increased beyond the operator's capacity for lifting or turning the batch.

A further object of the invention is to provide a dough working machine of the character described which does not expose relatively large areas of the rolled dough to the atmosphere at one time, thus overcoming a disadvantage attending the use of many known machines for the same purpose.

A still further object of the invention is to provide means for dusting a dough form on the bottom thereof while slidably transferring it from a moving conveyor onto a stationary surface.

These and other objects are attained by the means described herein and disclosed in the accompanying drawings, in which.

Figure 1:
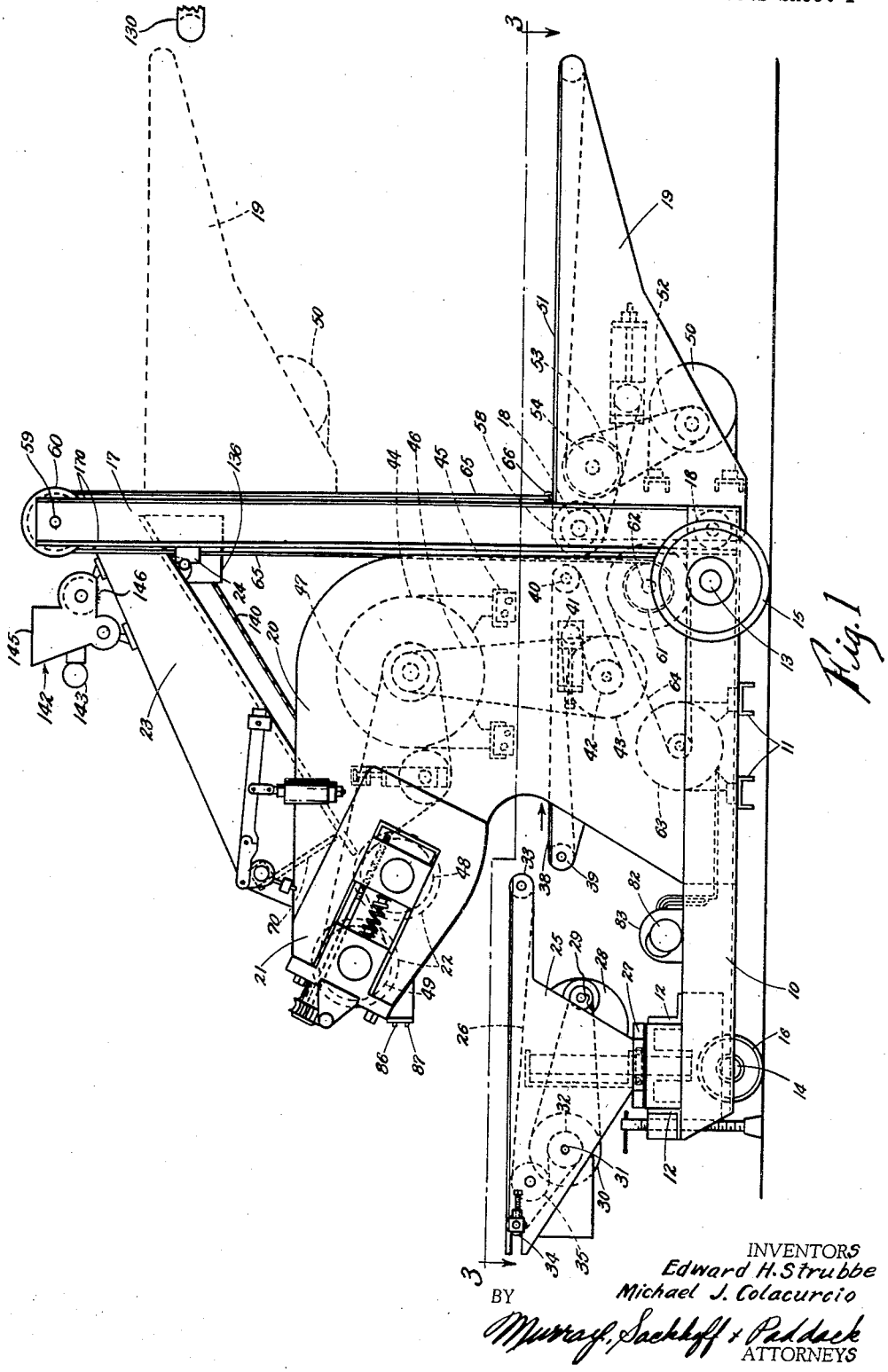
Fig. 1 is a side elevational view showing a semi-automatic dough brake machine embodying the invention.

The preparation of the cracker or biscuit dough or sponge prior to the finishing and cutting thereof has heretofore been carried out by both fully manual and by completely automatic methods, both of which entail the rolling and cross-rolling of the dough. The purpose of these operations is to attain a particularly desired textural quality in the dough which determines the texture of the ultimate product. The so-called manual method of dough working at this stage involves excessive heavy lifting, turning and carrying of the batches of dough which not only occupies a considerable amount of the operator's time but introduces an excessive fatigue factor. The fully automatic machines which utilize the so-called machine lapping or folding devices usually require a considerable area and length of the sheeted dough to be exposed to the atmosphere at all times so that there is always a possibility of a detrimental surface drying of the sheeted dough. Automatic machines that are free of this disadvantage are costly and very complex.

By the use of the semi-automatic machine of the present invention, the operator is enabled to utilize his energy and skill principally in the proper folding of the dough into stacked forms or batches by him for cross-rolling and for subsequent dispatch to a finishing and cutting machine.

The machine comprises generally a feed means, a single sheeting means, a turn-table defining an operator's station, and automatic conveying and elevating means whereby dough is taken from the turn-table and alternately returned to the feed means and discharged from the machine. At the operator's station the dough is lapped or folded longitudinally or transversely of the conveyor apron by a corresponding adjustment of the turn-table as required before or after the batch of dough is stacked or folded. This enables the operator to fold the sheeted dough transversely of the apron conveyor on the first rolling of the dough and to swing the conveyor apron on its pivotal axis, thereby turning the dough through 90° in a horizontal plane without lifting the form. The automatic cyclically operating conveying and elevating means then carries each batch of dough to the rear of the machine and discharges each initially rolled batch of dough back into the feed means for cross-rolling by the sheeting means and subsequent manual folding upon the turn-table conveyor apron. Those forms which have received the second or cross-rolling operation are conveyed and elevated to the rear of the machine and discharged to any receiving station which may be the form board or conveyor of a finishing and cutting machine.

We prefer to use individual electric motor drive for each of the mechanical elements of the machine and to provide motor driven electrical switching apparatus arranged for push-button starting by the operator at his station and whereby the sequence of electrical operation is controlled and designed to effect the return of a form to the feed means in one cycle of operation and the discharge of the form is effected in a succeeding cycle of operation. The feed means may thus receive a measured batch of dough from any suitable source of supply at intervals following the return of a previously rolled form.

Referring now to the drawings, the present embodiment of the invention is arranged in a compact unit on a base which may be conveniently constructed of side rails 10 spaced apart by pairs of channel members 11 and 12 and by rigid axles 13 and 14 at the rear and front of the machine respectively, and which carry the wheels 15 and castors 16 whereby the machine is tractionally supported. Rigidly secured at the rear ends of side rails 10 are vertical elevator rails 17. The rails 17 have side flanges 170 which form guide channels facing each other and receiving the guide rollers 18 of an elevator frame indicated generally as 19. A pair of side frames 20 are mounted on the side rails 10 forwardly of the elevator rails 17 and serve to support a dough sheeter 21 which may be of any approved construction and which is arranged so that its single pair of sheeting rollers 22 will discharge the dough toward the front of the machine. An inclined feed chute 23 is suitably supported, as by brackets 24 secured to the vertical elevator rails 17, and is arranged to discharge batches of dough gravitationally to the sheeting rollers 22.

Figure 2:
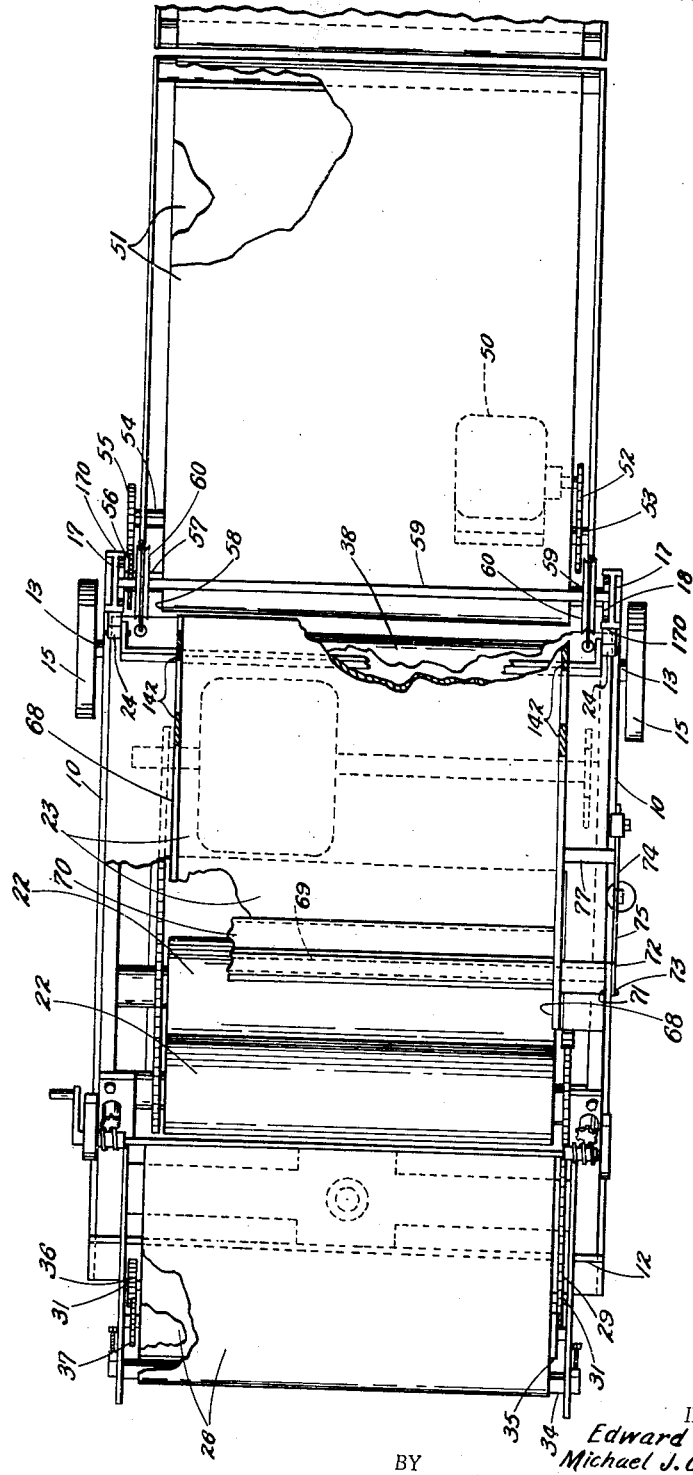
Fig. 2 is a top plan view of the device of Fig. 1, parts being broken away.
Figure 3:
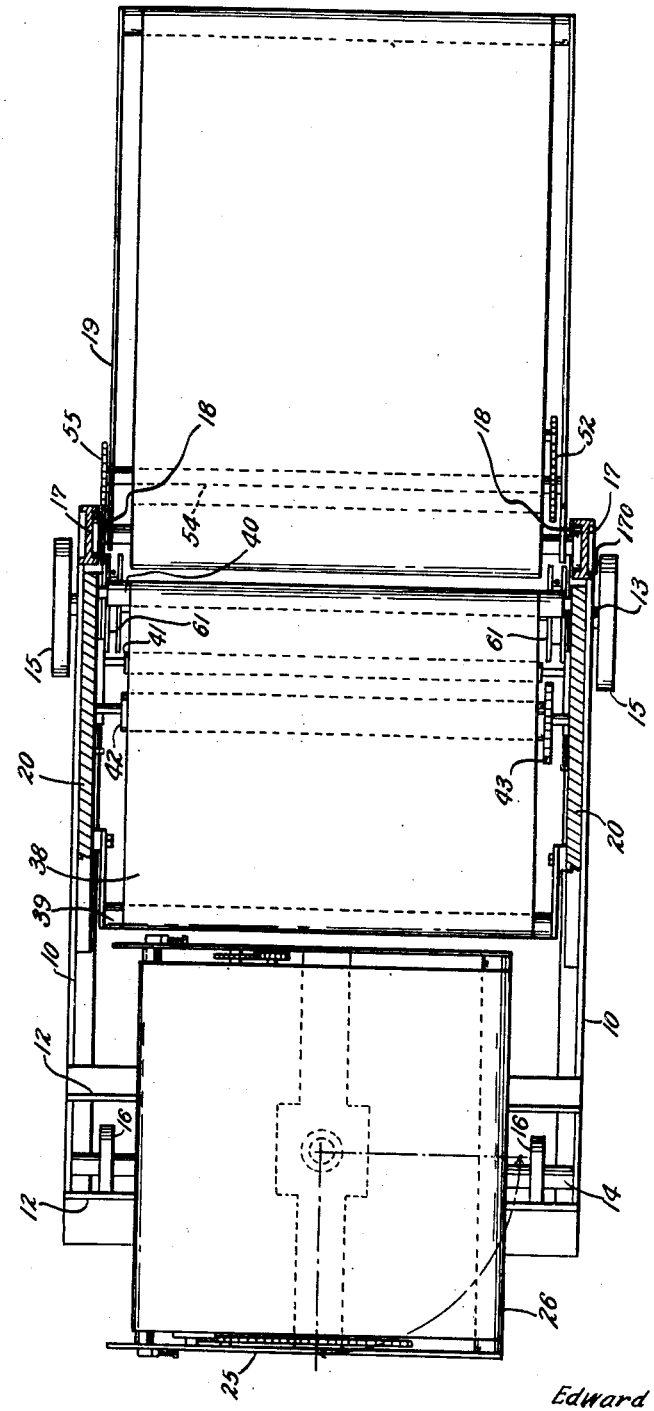
Fig. 3 is a view taken on line 3—3 of Fig. 1.

At the front end of the machine and suitably supported on the side rails 10 is a turn-table structure 25 having a conveyor apron 26 extending in part beneath the sheeting rollers 22 so that dough may be manually folded into stacked batches as it leaves the sheeting rollers. The turn-table 25 has a suitable roller-bearing structure 27 supported above the angle members 12 and upon which bearing the turn-table 25 may be moved through a quarter revolution to extreme positions wherein the conveyor apron 26 extends longitudinally of the machine, as shown in Fig. 2, or transversely of the machine, as shown in Fig. 3. The turn-table structure carries a motor 28 which may have a chain drive 29 which turns a sprocket 30 fixed to shaft 31 of the drive roller 32 for the conveyor apron 26. Conveyor apron 26 is supported in any suitable manner as by rollers 33 and belt tightener roller 34 in addition to the drive rollers 32 and 35. On the side opposite the chain drive 29, shaft 31 has a gear 36 meshing with gear 37 which drives roller 35. Beneath the sheeting means 21 and feed chute 23, and rearwardly of turn-table 25, is an intermediate belt conveyor 38 extending between rollers 39 and 40 and around a tightener roller 41 and drive roller 42. Drive roller 42 has a sprocket 43 fixed for rotation therewith. A motor 44 suitably supported, as on channel members 45 extending between the side frames 20, has a chain drive 46 extending about sprocket 43 so that the intermediate conveyor belt 38 is continuously driven in the direction of the rear of the machine (see Fig. 1). The motor 44 also has a drive chain 47 extending over the top of a sprocket 48 fixed for rotation with one of the rollers 22 and around the bottom of a sprocket 49 which is fixed for rotation with the other of the rollers 22. The motor 44 thus serves to continuously operate both the sheeting means and said intermediate conveyor 38.

Suitably mounted in the elevator frame 19 is a reversible motor 50 for driving a suitably supported elevator conveyor belt 51 by means of chain 52 operating on sprocket 53 which is fixed to the drive roller 54 of said conveyor. On the opposite end of the drive roll structure 54 is a gear 55 meshing with gear 56 which is fixed on the shaft 57 carrying the end roller 58.

The means whereby the elevator structure 19 may be bodily raised from the position shown in full lines in Fig. 1 to the position shown in dotted lines in Fig. 1 are as follows. A fixed shaft 59 is rigidly connected at opposite ends to the top portions of the vertical elevator rails 17 and serves as a brace for said rails and as a support for grooved pulleys 60. At the lower ends of said rails 17, and forwardly thereof, are sheaves 61 fixed on a transverse shaft 62 and driven by a reversible motor 63 through the agency of drive chain 64. Cables 65 are connected with the sheaves 61 and extend upwardly over the grooved pulleys 60 and thence downwardly where the ends of the cables are connected to hooks 66 in the top of the elevator frame 19.

Figure 4:
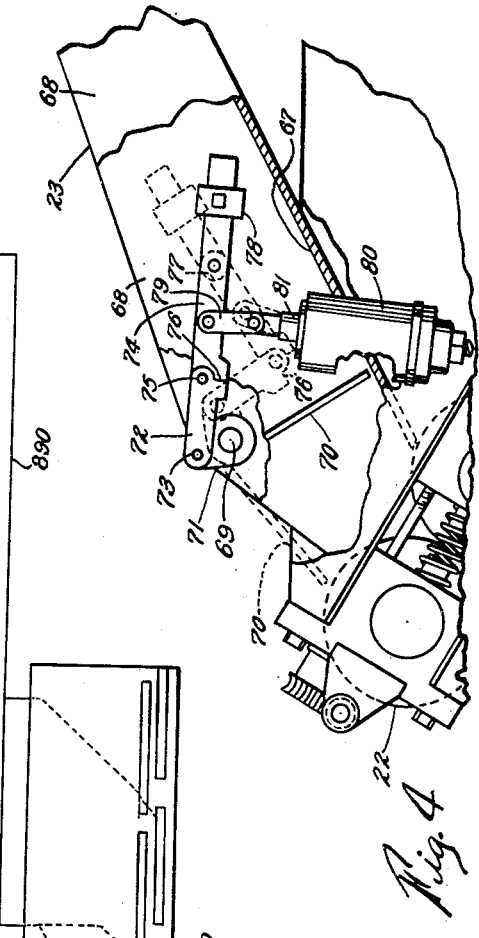
Fig. 4 is an enlarged fragmental view showing a gate mechanism forming a detail of the invention.

The feed means 23 is, in the present instance, constructed of an inclined feed board 67 having side walls 68 between which extends a rockable shaft 69. Fixed to the shaft is a gate 70 which traverses the space between side walls 68. The shaft 69 is extended and has a crank arm 71 fixed thereto outside of the side walls 68. A jointed lever has one end of section 72 thereof pivoted to the free end of crank arm 71 as at 73. The other end of jointed lever section 72 is connected to a complementary lever section 74 by pivot 75. Complementary abutment shoulders 76 on the lever sections 72 and 74 limit the extent of relative pivotal movement of said lever sections in one direction. The section 74 is pivotally mounted on a fixed pivotal stud 77 in the side wall 68. An adjustable weight 78 tends to move section 74 about its pivotal mounting on pivot stud 77 tending to bring the abutting shoulders 76 together with the complementary jointed lever sections longitudinally aligned. A link 79 is connected at its one end to the complementary lever section 74 intermediate the pivotal points 75 and 77 so that when the link is pulled downwardly the jointed lever breaks at the pivot joint 75 and rocks shaft 69 for moving the gate 70 from the position shown in full lines in Fig. 4 to the position shown in dotted lines in said Fig. 4. At this time the link and jointed lever sections assume the positions shown in dotted lines in Fig. 4. A fixedly mounted solenoid 80 has an armature 81 to which the bottom of link 79 is pivotally connected. When the solenoid 80 is electrically energized, the armature 81 is retracted downwardly into the interior of the structure to effect the position of parts illustrated in dotted lines in Fig. 4. By means of this electrically controlled gate, the operator may retain a batch of dough on the board 67 until he is ready to have the sheeting means 21 begin the sheeting operation on said batch. By the means hereinafter more fully described, the operator need merely complete the electrical circuit including the solenoid, whereupon the gate will be opened and retained in an open position by the energized solenoid until the electrical circuit is again broken by means which are coordinated with the electrical control which will now be explained.

The control means for integrating the operations of motors 28, 50 and 63, and of solenoid 80 into automatic operating cycles of the machine, includes a control motor 82, a rotary switching means indicated generally as 83, and driven by the motor 82, a magnetic holding switch 84 and a magnetic holding switch 85 for the solenoid and the control motor, respectively. A rotary switching means includes in its function the de-energizing of the solenoid 80 and control motor 82 at the proper times so that, in practice, the operator is merely required to press momentary switch buttons 86 and 87 before and after performing the manual folding or lapping operation on the dough.

Figure 5:
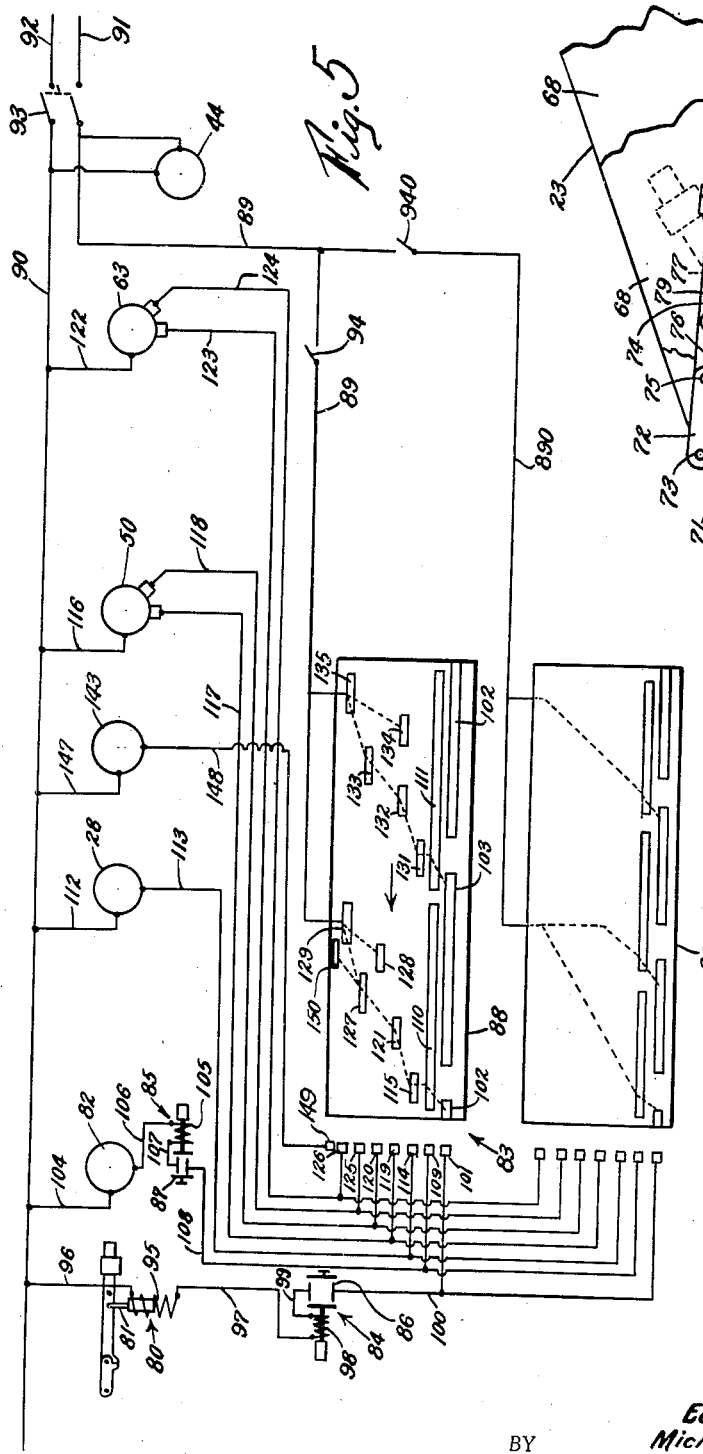
Fig. 5 is a wiring diagram showing the control for the cyclically operating mechanism.

The rotary switching means 83 may be of the conventional drum and contact finger construction. Referring now to Fig. 5, the drum 88 is shown as a development of the cylinder carrying a series of moving contacts, all of which are electrically connected to a common return 89 while the several electrical devices are connected at one side to a complementary common conductor line 90, thence through the suitable contact fingers to the drum contacts. A source of electrical supply 91—92 connects with lines 89—90 through a switch 93 whereby the entire machine may be rendered inoperative. The common return line 89 has a switch 94 therein serving as an emergency switch for stopping the automatic operation at any time. The motor 44 which drives the sheeting rolls 22 and the intermediate conveyor 38 is connected to lines 89—90 ahead of switch 94 so that those parts are continuously driven independently of the automatic operation of the remainder of the electrical apparatus.

The electrical connections through the solenoid 80 are arranged as follows. The solenoid coil or winding 95 is connected with line 90 by conductor 96 and at its other end by conductor 97 with one of the winding 98 of the magnetic holding switch 84. The manual push button switch is arranged to temporarily close the circuit through conductor 99 and 100 to a contact finger 101. A drum contact 102 on the drum 88 is aligned with finger 101 to complete the circuit through the common return line 89. As will be hereinafter fully appreciated, the drum 88 has the drum contacts 102 and 103 spaced at diametrically opposite sides of the drum, and the control motor which rotates the drum is arranged to bring the drum to rest after each one-half revolution of the drum with the contact finger 101 resting either on drum contact 102 or 103.

The control motor 82 is connected by conductor 104 to the conductor line 90 and is connected to the winding 105 of the magnetic holding switch 85 via a conductor 106. Conductors 107—108 connect through the momentary push-button switch 87 and the contacts of the magnetic switch 85 to a contact finger 109. Contact finger 109 is arranged to connect with drum contact 110 or 111 which are longitudinally aligned about the circumference of the drum 88 and which are of a length to fully span the distance between contacts 102 and 103 and between contacts 103 and 102, respectively, so that as motor 82 is energized and rotates the drum 88, contact finger 109 will ride over drum contact 110 while magnetic holding switch 85 is supplying current thereto at approximately one-half revolution of the drum 88. However, the contact 109 moves off of drum contact 110 for an instant during which magnetic holding switch 85 is de-energized, breaking the circuit to motor 82. Contact 109, however, due to a controlled momentum of the operation of the motor 82 and the drum 88, immediately rides onto drum contact 111. At this time the circuit to motor 82 is broken but in readiness to be closed whenever momentary push-button 87 is closed to energize the magnetic holding switch 85. It should be readily apparent also that drum contact 102 or 103 will, due to a substantially similar operation of magnetic holding coil 84, always be in position to energize solenoid 80 when drum 88 is at rest, and that the circuit to solenoid 80 will be maintained for a short time after rotation of drum 88 under the influence of motor 82 has begun.

The motor 28 which drives the turn-table apron 26 is arranged to be automatically energized almost immediately after the motor 82 begins to turn the contact drum 88. Said motor 28 is connected at one side with the line 90 by a conductor 112 while a conductor 113 connects the other side of said motor with a contact finger 114. A drum contact 115 which is brought into electrical contact with finger 114 as soon as the contact drum is placed in operation completes the circuit through the return line 89 causing motor 28 to drive the turn-table apron for an interval determined by the length of drum contact 115 and the rate of travel of the said turn-table apron. This period of operation is adjusted to continue while the apron 26 moves a folded batch of dough beneath the sheeting means 21 and onto the continuously operating intermediate conveyor 38. The last-named conveyor receives its power through motor 44 and carries the batch of dough onto the elevator conveyor 51 which is supported on elevator frame 19. The motor 50 is connected to line 90 at one side by conductor 116 and said motor, being a reversing motor, has connected to its other side conductors 117 and 118 which connect with contact fingers 119 and 120, respectively, and so connected that when current passes through by way of conductor 117, motor 50 operates in one direction and drives the elevator belt in the direction of the extreme end of the machine, thus serving to receive a batch of dough from the conveyor 38 and shift it completely onto the elevator conveyor 51. The electrical switching for this operation is effected by finger 119 riding onto drum contact 121. The length of drum contact 121 is in practice arranged so that the finger 119 will pass off of drum contact 121 and thus bring the elevator conveyor 51 to rest with a batch of dough carried thereon. The elevator motor 63 which drives the hoist mechanism for raising and lowering elevator frame 19 is connected as follows. Motor 63 is connected at one side to line 90 by conductor 122. At the other side of this reversing motor 63 are connected conductors 123 and 124, respectively, connectable alternately to the return line 89 for selectively driving motor 63 in opposite directions. Conductors 123 and 124 are connected to contact fingers 125 and 126, respectively. The circuit through conductor 123 and finger 125 is effected by way of drum contact 127 and the return line 89. When so connected, hoist motor 63 drives the sheaves 61 so that cables 65 are wound upon said sheaves and the elevator frame 19 is bodily raised. As drum contact 127 passes beyond contact finger 125, motor 63 stops and the elevator frame is brought to rest with the elevator conveyor 51 at the approximate level of the top of the feed board 67 which forms the base of the feed means 23. As the motor 82 continues to rotate the drum 88, contact finger 120 rides onto and completes a circuit through drum contact 128 so that the motor 50 begins to turn in a reverse direction immediately upon the arrival of the elevator frame 19 in a position of rest. This causes the elevator conveyor 51 to be driven in the direction of the front of the machine so that the batch of dough thereon is now delivered over the top inclined edge of the feed board 67 down which it slides to be brought to rest against gate 70. As soon as the movement of the drum causes drum contact 128 to pass beyond contact finger 120, the contact finger 126 completes an electrical circuit through drum contact 129 and the conductor 124, thus causing elevator motor 63 to operate in a reverse direction and then come to rest after lowering the elevator frame 19 to its initial position as shown in Fig. 1. At approximately this moment, in the rotation of drum 88, finger 101 rides onto drum contact 103. At the same time, contact 109 leaves contact 110 and breaks the circuit to the winding 105 in the magnetic holding switch 85. This de-energizes motor 82 but allows the drum 88 to move sufficiently to establish contact between the finger 109 and drum contact 111. Thus the first automatic cycle is completed and the parts are all at rest and in position to begin a second and somewhat slightly different cycle of machine operations.

The second cycle of automatic machine operations differs from the initial cycle just described in that the final operation of conveyor 51 is in the same direction as the first operation thereof so that the batch of dough which has been cross-rolled and is being automatically handled in the second automatic cycle of operation will be discharged over the rear end of the elevator frame 19 onto any suitable receiving station 130, the nature of which forms no part of the present invention but which in factory practice may be the conveyor or form board of a finishing and cutting machine for the biscuits and crackers.

In the cross-rolling of the batch of dough, push button 86 is first actuated by the operator causing solenoid 80 to open the gate 70 and retain the same in an open position while the dough feeds into the sheeting means 21. The operator folds and stacks the sheeted dough onto the apron 26 of the turn-table 25. Upon the completion of said manual folding operations the operator next presses the momentary push button switch 87 which causes the magnetic holding switch to close and retain an operating circuit for the control motor 82 through drum contact 111. Movement of the drum 88 carries drum contact 103 beyond contact finger 101 and de-energizes solenoid 80 allowing gate 70 to close so that a new batch of dough may be entered into the feed means 23 for the operator's subsequent attention. As the drum 88 continues to move, contact finger 114 completes a circuit through drum contact 131 operating motor 28 during a sufficient interval to cause the turn-table conveyor 26 to discharge its folded batch of dough onto intermediate conveyor 38 which continues the movement of said batch of dough to the rear end of elevator conveyor belt 51. Contact finger 119 now completes a circuit through drum contact 132 and maintains the same during an interval in which the batch of dough is carried completely onto elevator conveyor belt 51; whereupon, contact finger 119 breaks connection with drum contact 132. Immediately following this, contact finger 125 completes a circuit through drum contact 133 energizing the elevator motor 63 and raising the elevator 19 to its upper limit; whereupon, contact finger 125 breaks connection with drum contact 133 and the contact finger 119 establishes contact with drum contact 134 which again energizes motor 63 through conductor 123 and causes said elevator conveyor to discharge its burden off of the end of the elevator frame onto receiving station 130. At the completion of this operation, finger 119 leaves drum contact 134 and contact finger 126 completes a circuit through drum contact 135 which causes the elevator frame to be lowered and brought to rest. At approximately this moment, contact finger 101 makes contact with the drum contact 102 and contact finger 109 breaks contact and the circuit with drum contact 111 and then re-establishes contact with drum contact 110. No circuit, however, is established in the solenoid 80 or control motor 82 until the operator is again ready to complete them through the momentary push-button switches 86 and 87 respectively.

The gate 70 with its push-button opening and automatic closing mechanism affords several distinct advantages. As a safety factor, as can be best seen in Fig. 4, the gate in open position effectively guards against the introduction of an operator's hand into the feeding zone of rollers 22 which dough is passing between the latter. This guard remains in a safety position until the operator has completed the manual folding operation and has started the form on its way to the intermediate conveyor. The gate then automatically closes and permits the next dough batch or form to be held in readiness for the operator. It will also be noted that the operator may gain time as and when desired by initiating the gate-opening movement immediately as a previously folded form reaches the intermediate conveyor so that he can proceed with the rolling and folding of a new batch while the previous form is passing over the conveying and elevating mechanism in course of its discharge from the machine.

Figure 6:
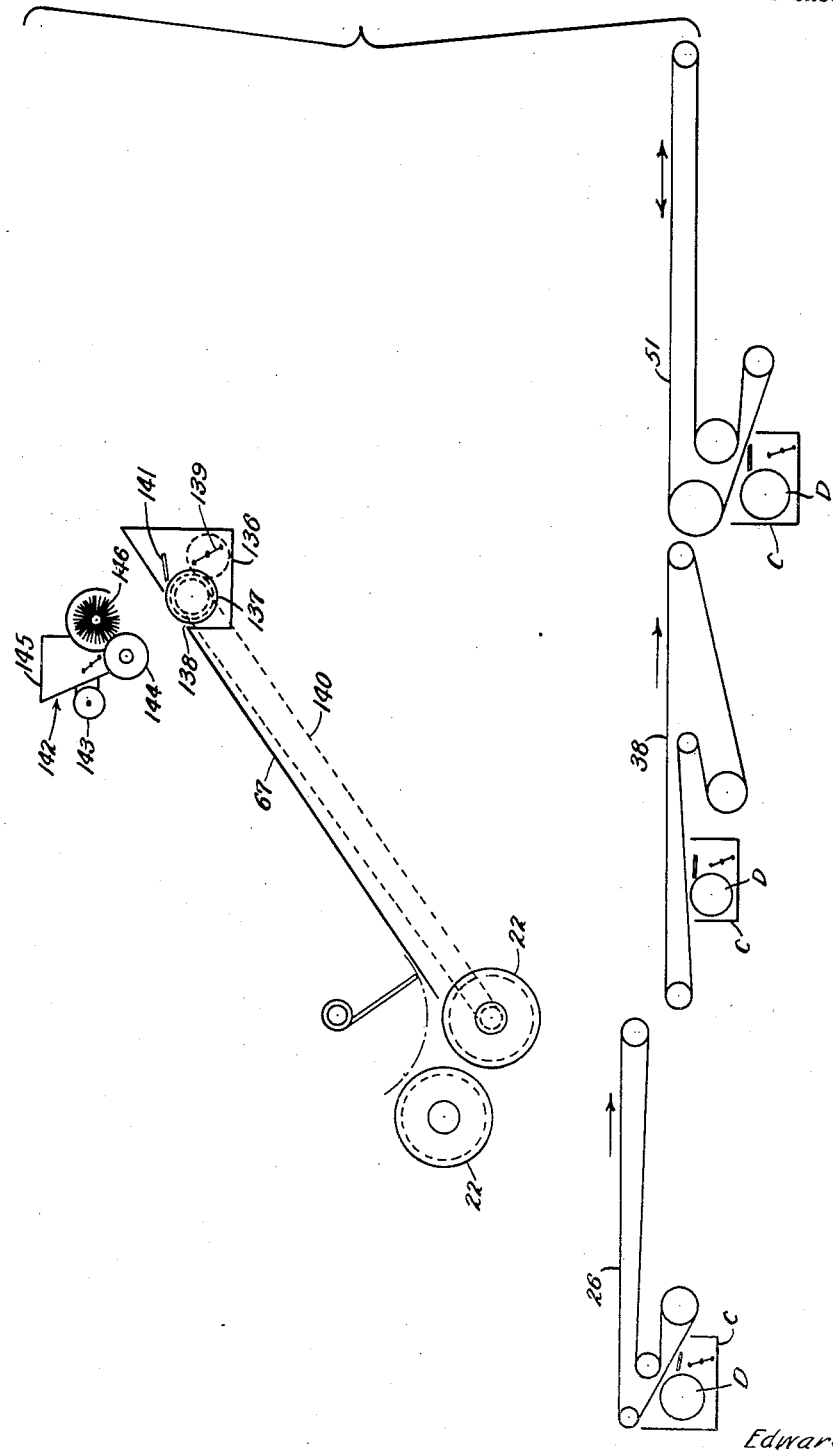
Fig. 6 is a diagrammatic side elevational view showing the dusting means for the device.

The dusting of the conveyors with flour to prevent the dough from sticking is effected, as shown diagrammatically in Fig. 6, providing beneath each conveyor belt a bin or chamber C containing flour and having a driven dusting roll D in contact with the associated conveyor belt and an agitator which throws the flour against said roll D. The surface of each moving conveyor is thus dusted in advance of receiving the dough.

In moving the form from the moving elevator conveyor belt 51 to the stationary inclined feed board 67, it is not feasible to dust the feed board because the dough merely pushes the flour ahead of it and cannot be taken up by the bottom surface of the dough. To overcome this difficulty we have provided a novel and very effective relationship between the top of the feed board 67 and the conveyor 51 so that the bottom surface of the dough is properly dusted in advance of its sliding movement over said feed board. A dust chamber 136 is mounted transversely of and beneath the upper end of the board 67. A transverse dusting roll 137 projects through the gap 138 between the top of said feed board and the top of chamber 136 which receives the dough from conveyor 51 and directs it over the partially protruding surface of the roll 137. This serves to deposit on the bottom of the dough the surface film of flour on the roll, which roll also assists in moving the dough onto the feed board. A suitable agitator 139 is driven in unison with the roll 137 by a chain 140 that receives its power from the shaft of the lower sheeting roller 22. Scraper 141 is housed within chamber 136 and serves to remove excess flour from the surface of roll 137 in advance of the contact of the dough thereon.

The application of flour for dusting the top surface of the dough form at this time may be effected in any suitable manner. We prefer to dust the top of the dough form by automatically operating dusting means which is cyclically actuated and so timed as to discharge its dust during that interval in which the dough forms normally leave the conveyor 51 and move onto the surface 67 of the feed board. The dusting means, indicated generally as 142, is spaced above the surface 67 of the feed board 23 sufficiently to clear the maximum intended thickness of dough form passing beneath it. The dusting means is driven by a motor 143 and comprises a suitably roughened roll 144 operating partly within and partly outside a hopper 145 from which it receives a surface charge of flour and which charge is removed therefrom by a rotary brush 146 as a directional dust stream. (See Fig. 6.)

The cyclic control for motor 143 of duster mechanism 142 is wired as follows: A conductor 147 connects one side of motor 143 with line 90 and a conductor 148 connects the other side of said motor with contact finger 149. Drum contact 150, as will be noted in Fig. 5, is so positioned as to complete a circuit through return line 89 shortly after finger 120 has completed its circuit through drum contact 128 and said finger 149 breaks its circuit with drum contact 150 thus stopping motor 143 at approximately the same time that motor 50 is de-energized and conveyor belt 51 has completed its movement toward the feed means 23.

The means or mode of initially introducing dough batches to the feed means 23 form no part of the present invention since the batches may be introduced manually or by any suitable batch-depositing means (not shown) and from any convenient direction. This greatly facilitates the adaptation of the machine to a number of different arrangements with other dough working or dough handling machinery within the plant.

It will be understood changes in kind and number of cycles of operation may be made by replacing the contact drum 88 with another drum carrying suitable arrangements of drum contacts. In the present embodiment (see Fig. 5) we have shown the machine equipped electrically to carry out either of two selected cycle groups by electrically switching from one contact drum, such as 88, to another drum 880 which constantly rotates in unison with drum 88 and has its own set of contact fingers. Drum 880 has a return line 890 with a switch 940 therein. The contact fingers are duplicates of the hereinbefore described contact fingers respectively, and connect to the same respective conductors. The drum 880, as shown, is arranged to effect the return feed of the form twice before discharging the same from the machine and therefore has two similar groups of drum contacts 102, 110, 115, 121, 127, 128 and 129 following in succession, after which there follows one group of contacts containing the drum contacts 103, 111, 131, 132, 133, 134 and 135. In practice, the functions of switches 94 and 940 are effected by a manual selector switch of any suitable design (not shown).

The invention is not to be considered as limited to the exact structural details of the disclosed embodiment since these are subject to change within the spirit of the invention and the scope of the appended claims.

What is claimed is:

1. In a dough brake machine the combination of a sheeting means, a turn-table disposed forwardly of and below said sheeting means to receive dough in manually folded and stacked condition as it is sheeted by said sheeting means, a conveying and elevating mechanism disposed rearwardly of the turn-table and beneath the sheeting means for returning dough from the turn-table to the sheeting means, and means to cyclically actuate the conveying and elevating mechanism for successively receiving dough batches from the turn-table and directing said batches into and away from said sheeting means.

2. In a dough brake machine the combination of a sheeting means, a turn-table disposed forwardly of and below said sheeting means to receive dough in manually folded and stacked condition as it is sheeted by said sheeting means, a conveying and elevating mechanism disposed rearwardly of the turn-table and beneath the sheeting means for returning dough from the turn-table to the sheeting means, and automatic power driven means to cyclically actuate the conveying and elevating mechanism for successively receiving dough batches from the turn-table and directing said batches alternately into and away from said sheeting means.

3. In a dough brake machine the combination of a feed means, a dough sheeting means fed thereby, a turn-table having a pivotal mounting forwardly of the sheeting means, an apron mounted on said turn-table and adapted for the manual folding of dough into stacked batches as it is sheeted, and operator-initiated automatic means for moving said stacked batches of dough beneath said sheeting means and said feed means and thence into said feed means.

4. In a dough brake machine the combination of an inclined feed board, a pair of dough sheeting rollers fed thereby, a pivotally shiftable structure including an endless moving apron arranged to receive dough from the sheeting means selectively in transverse and longitudinal relation to said moving apron, an intermediate conveyor to move dough from said apron beneath the sheeting and feed means, and a cyclically operable elevator and reversible conveyor structure for removing dough from the intermediate conveyor and discharging it into and away from the upper end of said inclined feed board.

5. In a dough brake machine the combination of a feed means, a pair of sheeting rollers fed thereby, a gate in the feed means, a turn-table apron below the rollers, an intermediate conveyor under said feed means and rollers and onto which the turn-table apron may discharge, an elevator frame vertically movable at the rear of the machine, a reversible conveyor on said frame and movable thereby into cooperative relation with the intermediate conveyor and said feed means respectively, and electrical operating means including independent motors for said apron, said elevator frame, and said reversible conveyor, a control motor and switching means driven thereby for cyclically moving said apron, elevator frame and reversible conveyor whereby successive batches of dough are moved from the apron to the level of the feed means and discharged into and away from said feed means in predetermined sequence.

6. In a dough brake machine the combination of a feed means, a sheeting means fed thereby, a self-closing gate for withholding feed to the sheeting means, and means moving and retaining said gate in an open position permitting feed to the sheeting means and shielding the sheeting means against entry of extraneous objects from above the feed means in the vicinity of said sheeting means.

7. In a dough brake machine the combination of a feed means, a sheeting means arranged to receive dough from said feed means, a cyclically operable conveyor means for returning dough from the sheeting means to the feed means, a gate normally urged to closed position retaining the dough on the feed means, selectively energizable means to open the gate and retain it in open position, and selectively operable means to actuate the cyclically operable conveyor means and de-energize said gate opening means.

8. In a dough brake machine the combination of a base, a turn-table apron at the forward end of the base, an elevator at the rear of said base, a sheeting means disposed in overhanging relation to the turn-table apron, an inclined feed board having its rear end disposed adjacent the upper limit of said elevator and its forward end disposed in feeding relation with the sheeting means, an intermediate conveyor between said turn-table apron and the lower limit of said elevator and beneath the sheeting means and feed board, drive means for continuously driving said intermediate conveyor and sheeting means, a reversible conveyor on said elevator, independent electrical drive means for said turn-table apron, said elevator, and said reversible conveyor respectively, and a motor driven switching mechanism cyclically controlling said independent electric drive means whereby the turn-table apron is operated to move dough batches accumulated from the sheeting means onto said intermediate conveyor, and said reversible conveyor and elevator are actuated to receive said successive batches in the lower position of the elevator and move them to the level of the feed means where said reversible conveyor discharges successively elevated dough batches in opposite directions in predetermined order.

9. In a dough brake machine the combination of a dough sheeting means arranged to periodically receive dough batches and deliver the same in sheeted condition in a generally forwardly direction, a conveyor apron structure pivoted for shifting in a horizontal plane beneath the sheeting means for receiving the sheeted dough in manually folded stacked relation selectively in longitudinal and transverse folds with respect to said apron, means including a reversible conveyor at the rear of the machine and an intermediate means for transferring said dough batches in preselected relation from said apron, and control means including automatic switching mechanism and independent drive motors for said apron, and said reversible conveyor for effecting predetermined operating cycles of dough movement in said machine.

10. In a dough brake mechanism the combination of sheeting means, a movable apron disposed in the path of discharge of the sheeting means, an intermediate conveyor to receive dough from the apron and move it rearwardly beneath the sheeting means, an elevator mechanism including an independently operating reversible conveyor whereby dough is received from the intermediate conveyor and moved alternately towards and away from the sheeting means, motors for said apron, said elevator mechanism and said reversible conveyor respectively, rotary switching means including fixed and moving contacts for controlling the respective motors in predetermined sequence, a control motor for driving the switching means, a manually closed magnetic holding switch in electrical circuit with said motor, and a fixed and moving contact in the switching means in said circuit whereby the control motor and switching means are de-energized automatically on predetermined movement of the switching means.

11. In combination an inclined stationary form board, an endless traveling conveyor arranged to carry dough forms to the form board and move them slidably onto the form board and a rotatable flour dusting roll mounted with the upper periphery thereof interposed between said conveyor and said board whereby flour from the surface of said roll is applied to the bottom surface of the dough form after it leaves the conveyor and in advance of its slidable contact with the stationary form board.

12. In a dough handling mechanism a moving conveyor, a stationary form board for slidably receiving dough forms from said conveyor, a flour dusting roller having its upper periphery disposed transversely across the path of movement between said conveyor and form board for assisting the transfer of dough forms to said form board and simultaneously applying flour from its surface to the bottom surface of the dough in advance of slidable contact with the form board.

13. In combination a stationary form board, a moving conveyor to receive dough forms and move them slidably onto said board, a dust chamber below the receiving end of the board, a roller operating in the chamber and having its top peripheral surface in position such that it contacts the bottom surface of the dough form as the latter is moved to the form board by said conveyor, means to uniformly apply dust to said roll in the dust chamber and means to drive the roll.

14. In a device of the class described the combination of an inclined form board, sheeting mechanism fed thereby, an endless conveyor for receiving dough forms and discharging them onto the form board, and a flouring device disposed intermediate said form board and endless conveyor for dusting the bottoms of dough forms as they are discharged onto said form board.

15. In a device of the class described the combination of a sheeting means, an inclined form board feeding the first-mentioned means, a series of cyclically operating conveyors for returning dough forms from the sheeting means to said form board for cross rolling, dusting means for applying flour to the conveyors during operation thereof, continuously operating means applying flour directly to the bottom surface of each dough form at it is returned to said form board from the conveyors, and means cyclically operated with said series of conveyors for discharging flour directly to the top surface of each dough form as it passes onto said form board from said series of conveyors.

EDWARD H. STRUBBE.
MICHAEL J. COLACURCIO.